US008628042B2

(12) United States Patent
Imbert et al.

(10) Patent No.: US 8,628,042 B2
(45) Date of Patent: Jan. 14, 2014

(54) ELECTRICAL POWER SUPPLY AND CONTROL DEVICE FOR EQUIPMENT OF A ROTOR, AND AN AIRCRAFT FITTED WITH SUCH A DEVICE

(75) Inventors: Nicolas Imbert, Marseilles (FR); Charles Chuc, Marseilles (FR)

(73) Assignee: Eurocopter, Marignane Cedex (FR)

( * ) Notice: Subject to any disclaimer, the term of this patent is extended or adjusted under 35 U.S.C. 154(b) by 271 days.

(21) Appl. No.: 13/110,349

(22) Filed: May 18, 2011

(65) Prior Publication Data

US 2011/0290942 A1    Dec. 1, 2011

(30) Foreign Application Priority Data

May 28, 2010 (FR) ..................................... 10 02257

(51) Int. Cl.
*B64D 15/12*   (2006.01)
(52) U.S. Cl.
USPC ....................... 244/134 D; 310/68 B; 307/9.1
(58) Field of Classification Search
USPC ........ 244/134 R, 134 D; 416/95; 307/9.1, 13; 310/68 B
See application file for complete search history.

(56) References Cited

U.S. PATENT DOCUMENTS

| | | | | |
|---|---|---|---|---|
| 3,496,331 A | * | 2/1970 | Fourcade et al. | 219/201 |
| 4,292,502 A | * | 9/1981 | Adams | 219/483 |
| 4,410,794 A | * | 10/1983 | Williams | 219/486 |
| 5,519,275 A | | 5/1996 | Scott | |
| 5,572,178 A | * | 11/1996 | Becker et al. | 336/120 |
| 6,181,235 B1 | * | 1/2001 | Smith | 318/696 |
| 6,216,979 B1 | * | 4/2001 | Faure et al. | 244/17.11 |
| 7,355,302 B2 | * | 4/2008 | Stonestreet et al. | 307/29 |
| 7,602,081 B2 | * | 10/2009 | Stonestreet et al. | 307/29 |
| 7,926,763 B2 | * | 4/2011 | Froman | 244/134 D |
| 2006/0226292 A1 | * | 10/2006 | Houlihan et al. | 244/134 R |
| 2008/0152494 A1 | * | 6/2008 | Froman | 416/95 |

FOREIGN PATENT DOCUMENTS

| | | |
|---|---|---|
| EP | 1541467 A1 | 6/2005 |
| GB | 2264812 A | 9/2009 |
| JP | 2004161237 | 6/2004 |

OTHER PUBLICATIONS

Search Report and Written Opinion; Application No. FR 1002257; Dated Jan. 13, 2011.
Translation of Notice of Reason for Rejection of Korean Patent Application No. 2011-0049013; Applicant EUROCOPTER.

* cited by examiner

*Primary Examiner* — Philip J Bonzell
(74) *Attorney, Agent, or Firm* — Brooks Kushman P.C.

(57) ABSTRACT

The present invention relates to an electrical power supply and control device (10) for equipment (9) of a rotor (5), the device having a three-phase AC generator (20) in a stationary frame of reference. The device (10) comprises a rotary field transformer (30) having a stationary portion (31) connected to said generator (20) and a rotary portion (32) connected to a sequencer (50) that is arranged in a rotary frame of reference, said device (10) including control means (51) for controlling the sequencer (50) and located in said stationary frame of reference, the control means being connected to the sequencer (50) via contactless connection means (200), said sequencer (50) being suitable for electrically powering said equipment (9) on order of said control means (51).

15 Claims, 2 Drawing Sheets

ELECTRICAL POWER SUPPLY AND CONTROL DEVICE FOR EQUIPMENT OF A ROTOR, AND AN AIRCRAFT FITTED WITH SUCH A DEVICE

CROSS REFERENCE TO RELATED APPLICATIONS

This application claims the benefit of FR 10 02257 filed on May 28, 2010, the disclosure of which is incorporated in its entirety by reference herein.

BACKGROUND OF THE INVENTION (1) Field of the Invention

The present invention relates to an electrical power supply and control device for equipment of a rotor, and to an aircraft fitted with such a device.

The invention thus lies in the technical field of electrical power supply and control means for equipment present on a rotary rotor, with passage from a stationary frame of reference to a rotary frame of reference. More particularly, the technical field is that of electrical power supply and control means for de-icing and anti-icing means of a rotorcraft rotor.

(2) Description of Related Art

A first device is known that has an alternating current (AC) generator connected to an electrical unit sometimes referred to as a "power de-icing" unit. The electrical unit is provided in particular with a rectifier and a sequencer for powering a plurality of electric cables in a predetermined sequence. Furthermore, for safety reasons, the electrical unit is duplicated.

The generator and the electrical unit are installed in a stationary frame of reference, i.e. in the airframe of the aircraft.

Consequently, the first device includes slip rings comprising a non-rotary portion and a rotary portion connected together by brushes. By way of example, the non-rotary portion possesses circular electrical tracks known as slip rings that are powered electrically by electric cables coming from the electrical unit, with the rotary portion having respective brushes running along each of the slip rings.

The rotary portion then powers a plurality of heater mats for each blade in the sequence that is programmed in the electrical unit for the purpose of de-icing or of preventing ice forming on the blade, each mat being connected by an electric cable to a brush of the rotary portion of the slip rings.

That first device combining an electrical unit with slip rings is very heavy, in particular because of the large number of electric cables and slip rings.

That first device can therefore easily be installed on a powerful heavy rotorcraft. However installing such a device on a medium weight rotorcraft may reduce the number of passengers by two, for example.

Furthermore, the friction between each brush and the corresponding slip ring tends to degrade the performance of the slip rings. Maintenance actions requiring the device to be dismantled then need to be undertaken relatively frequently. Unfortunately, the slip rings are sometimes difficult to access, and the cost of maintenance may be high, requiring the rotorcraft to be grounded for a long time.

Finally, it should be observed that since the electrical unit is installed in the airframe of the aircraft, the electrical unit is likely to disturb nearby electrical equipment. Furthermore, the electrical unit presents non-negligible bulk and is therefore penalizing.

Document U.S. Pat. No. 7,602,081 presents a second device having a control unit arranged in a stationary frame of reference, the control unit being connected to slip rings.

Those slip rings then power electrical equipment via a distributor unit arranged in a rotary frame of reference.

The control unit then generates electricity that is transmitted to the distributor unit via the slip rings, the slip rings acting as an interface between the rotary frame of reference and the non-rotary frame of reference, the distributor unit converting the electricity it receives and powering the electrical equipment as a function of electrical signals that reach it.

Document US 2006/0226292 also uses slip rings with brushes.

Finally, document U.S. Pat. No. 5,519,275 presents a rotary power transformer allowing information to be transmitted via a carrier current.

Carrier current technology is advantageous. Nevertheless, the data transmission rate and the observed interference limit that technology to restricted applications.

It should be observed that the same applies to slip rings. It is difficult to cause a low power signal coming from a temperature or ice sensor, for example, to transit via slip rings or a carrier current.

It should be observed that the state of the art also includes document U.S. Pat. No. 5,572,178 and document EP 1 541 467 relating to a modular de-icing/anti-icing device for an airfoil surface.

SUMMARY OF THE INVENTION

An object of the present invention is thus to propose a relatively lightweight device that makes it possible to overcome the above-mentioned limitations, without disturbing equipment arranged in the airframe and not requiring large amounts of maintenance.

In one aspect, the invention seeks to avoid using slip rings for transferring electrical power to equipment on a rotor and for controlling said equipment.

According to the invention, an electrical power supply and control device for equipment of a rotor has a three-phase AC generator in a stationary frame of reference, e.g. being fastened to the airframe of a rotorcraft. It can be understood that the electricity generator may be an alternator used for other purposes, e.g. the basic alternator of a rotorcraft that is provided with said rotor. The electricity generator is thus not necessarily dedicated solely to the device.

More particularly, the device is suitable for powering de-icing or anti-icing type means for combating icing of the blades of a rotorcraft rotor, a lift rotor or an antitorque rotor, in particular. The device may nevertheless also be used to deliver electrical power to any type of equipment, e.g. lights.

The device is remarkable in particular in that it includes a rotary field transformer having a stationary portion electrically connected to the generator and a rotary portion electrically connected to a sequencer that is arranged in a rotary frame of reference, the device including control means for controlling the sequencer and located in the stationary frame of reference, the control means being connected to the sequencer by contactless connection means, the sequencer being suitable for electrically powering the equipment on order of the control means.

Thus, the invention combines a transformer, a sequencer, and contactless connection means. The synergy between these components serves to replace the electrical unit and the slip rings of the first above-described device, for example.

Thus, the present device does not have an electronic power unit arranged in the airframe of a rotorcraft that might disturb nearby equipment, but rather a transformer having a stationary portion suitable for being secured to a rotorcraft airframe and co-operating with a rotary portion suitable for being secured to a rotor.

The transformer delivers electrical power to a sequencer which shares said power among the pieces of equipment of the rotor. The sequencer is thus in a rotary frame of reference associated with the rotor and not inside the airframe.

Furthermore, the combination of the device of the invention includes contactless connection means, an optical rotary joint, or an ultrasound rotary joint, or even means providing a connection by high frequency, for example, serving in particular to transmit orders to the sequencer. The delivery of electrical power and a control order via the sequencer may be controlled by the contactless connection means in response to at least one control means arranged in the cockpit, for example.

Conventionally, the sequencer may possess a processor or the equivalent, having logic that is implemented by the sequencer when it is activated by the control means.

As explained below, the contactless connection means may serve to transfer any type of information both from the airframe to the rotor and from the rotor to the airframe, without degrading performance.

From a maintenance point of view, it is possible to implement components that do not require complex maintenance actions.

As a result, the novel combination of the device provides for multiple elements that operate in synergy to provide an alternative that is advantageous compared with known devices.

The device may also include one or more of the following characteristics.

For example, the stationary portion of the transformer is surrounded by the rotary portion, thereby significantly favoring access to the rotary portion of the transformer for maintenance operations.

The stationary portion optionally includes the primary member of the transformer, the secondary member of the transformer being arranged on the rotary portion of the transformer.

Furthermore, the stationary portion may include at least three three-phase primary windings each powered by the generator, these three primary windings constituting the primary member of the transformer. For example, three electrical conductors power the primary member of the transformer with AC at 115 volts (V).

Similarly, the rotary portion includes at least three three-phase secondary windings, these three secondary windings constituting the secondary member of the transformer. For safety reasons, the system may be duplicated, e.g. by providing two sets of secondary windings. Such a system is thus redundant.

In a variant, the rotary portion includes at least one electrical converter of PD3 rectifier type for delivering direct current (DC) to the sequencer.

A rectifier of type PD with an index number q comprises a circuit having a source in a star configuration and two switches or rectifiers in a "bridge" configuration with the star-configuration source, the index q representing the number of phases. Reference may be made to the literature to obtain more details about such a rectifier.

The electrical converter may include diodes, or indeed thyristors, with the thyristors being controlled via the contactless connection means, for example.

The rotary portion of the transformer has an inner periphery facing the non-rotary portion and an outer periphery, the PD3 rectifier type electrical converter opening out to the outer periphery.

The conversion of AC to DC thus takes place within the transformer, the electrical converter being incorporated in the rotary portion of the transformer.

For example, three electrical conductors then power the primary member of the transformer with AC at 115V. Two electrical conductors leave the transformer, more precisely the electrical converter to power the sequencer with DC at 270 V.

Furthermore, in order to optimize size, the contactless connection means between the rotary portion and the stationary portion may be coaxial.

In addition, contactless connection means may be an optical rotary joint comprising a stationary member connected by an optical fiber to the control means, and a rotary member connected to the sequencer, e.g. by an optical fiber.

Such an optical rotary joint serves in particular to implement multiplexing techniques, thereby making the device more flexible in the face of varying conditions, since any electrical system can be controlled by multiplexed controls. In contrast, it should be recalled that a set of slip rings with brushes and carrier current technology is not suitable for passing any type of control signal because of the noise generated by the brushes and because of the low level of the carrier current, for example.

In a variant, the optical rotary joint includes at least one unidirectional lens favoring the passage of an order from the stationary member to the rotary member. In another variant, and depending on requirements, the optical rotary joint includes at least one bidirectional lens favoring the passage of a signal from the stationary member to the rotary member and from the rotary member to the stationary member, which signal may be an order or indeed information coming from a sensor, for example.

In another version, the contactless connection means comprise an ultrasound rotary joint. Such an ultrasound rotary joint may comprise a stationary member emitting ultrasound waves as a function of orders it receives and a rotary member receiving said ultrasound waves.

In another version, the contactless connection means comprise a first antenna connected to the control means and a second antenna connected to the sequencer. The first and second antennas co-operate with each other, the first antenna optionally being capable of transmitting a signal to the second antenna and/or of receiving a signal coming from the second antenna in the stationary frame of reference via one or more members, the second antenna optionally being capable of transmitting a signal to the first antenna and/or of receiving a signal coming from the first antenna in the rotary frame of reference.

In addition to a device, the invention also provides an aircraft provided with such a device.

Consequently, an aircraft of the invention is provided with a rotor driven by a rotor mast that is set into rotation by a power gearbox arranged inside an airframe of the aircraft, the rotor having at least one piece of electrical equipment.

When the aircraft is a rotary wing aircraft, said rotor may be an element of said rotary wing, or it may be an antitorque rotor. If the aircraft is provided with at least one propeller, said rotor is an element of said propeller.

The aircraft is remarkable in particular in that it includes an electrical power supply and control device for equipment of the rotor, the device being provided with a three-phase AC generator arranged in the airframe, the device having a rotary field transformer provided with a stationary portion connected to the airframe and a rotary portion constrained to rotate with the rotor, the stationary portion being connected to the generator and the rotary portion being connected to a sequencer constrained to rotate with the rotor, the device including control means arranged in the airframe and connected to the sequencer via contactless connection means, the sequencer electrically powering the equipment on order of the control means.

The AC generator may be a conventional alternator of the aircraft that is also used for other purposes, the generator possibly being driven by said power gearbox.

In addition, the aircraft may include one or more of the above-mentioned characteristics of the power supply device, or indeed one or more of the following characteristics.

For example, the stationary portion of the transformer includes a fastener shaft inside the rotor mast for fastening to the airframe, either directly or via the power gearbox, for example, the rotary portion and the sequencer being secured to the rotor.

In addition, the equipment powered by the device includes at least one means suitable for combating icing, such as anti-icing means or de-icing means, for example.

BRIEF DESCRIPTION OF THE DRAWINGS

The invention and its advantages appear in greater detail from the following description of an embodiment given by way of illustration with reference to the accompanying figures, in which.

Elements that are present in more than one of the figures are given the same references in each of them.

DETAILED DESCRIPTION OF THE PREFERRED EMBODIMENTS

Figure 1:
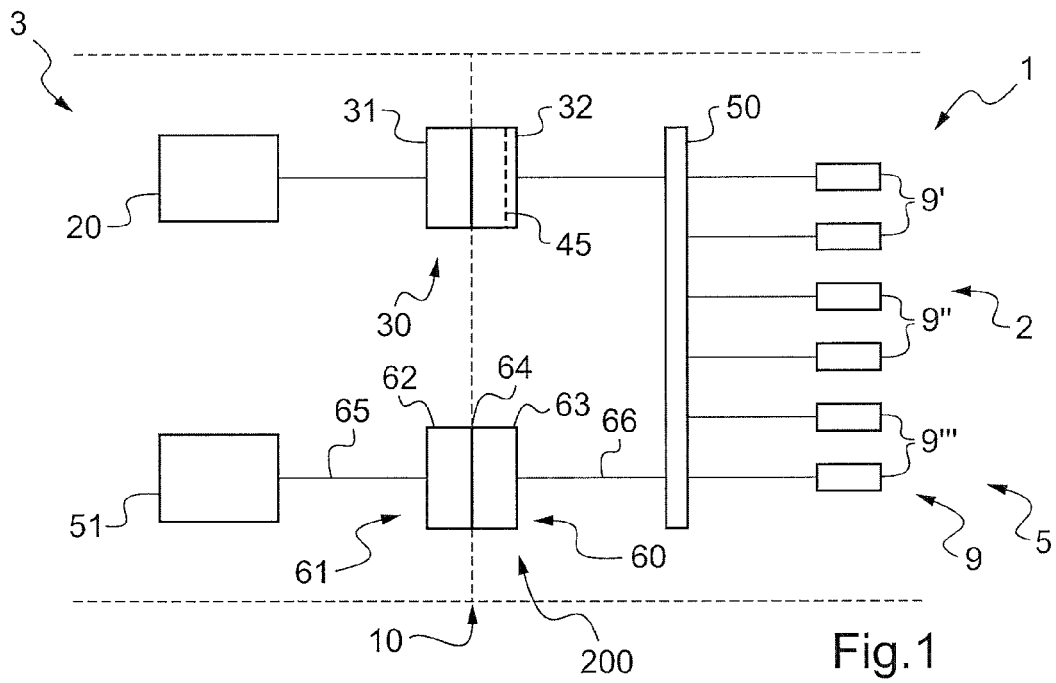
FIG. 1 is a diagram explaining the invention.

FIG. 1 shows an aircraft 1 of the invention in diagrammatic manner.

The aircraft 1 comprises an airframe 3 and a rotor 5, e.g. an antitorque rotor or a rotor of a rotary wing 2 of a rotorcraft, or indeed a propeller of an aircraft.

A stationary frame of reference is associated with the airframe 3, while conversely a rotary frame of reference is associated with the rotor 5, the rotary frame of reference rotating about the axis of rotation of the rotor 5 relative to the stationary frame of reference.

The stationary elements of the airframe 3 are then said to be "stationary", whereas in contrast the elements that are rotating together with the rotor 5 relative to the airframe 3 are said to be "rotary".

The invention provides a device 10 for electrically powering and controlling equipment 9 fastened to the rotor 5. By way of example, for a rotor having three blades, the equipment 9 may comprise first heater mats 9' for a first blade, second heater mats 9'' for a second blade, and third heater mats 9''' for a third blade, these heater mats serving to de-ice the blades or to prevent ice forming on them. Other devices for de-icing or anti-icing may be used.

The device 10 comprises an electricity generator 20, serving in particular to generate three-phase AC at 115 V and 400 hertz (Hz). This electricity generator 20 is located in the airframe 3 so the electricity generator 20 is stationary and it does not rotate together with the rotor 5.

The electricity generator 20 is electrically connected to a rotary feed transformer 30 serving to transit from a stationary frame of reference to a rotary frame of reference.

The transformer comprises a stationary portion 31 connected to the airframe 3 and a rotary portion 32 constrained to rotate with the rotor 5.

It should be observed that the rotary portion may comprise an electrical converter 45 of the PD3 rectifier type for transforming the AC coming from the electricity generator 20 into DC.

The rotary portion is then connected to a sequencer 50. The sequencer powers the electrical equipment 9, e.g. in a predetermined sequence. When the equipment 9 comprises a plurality of heater mats 9', 9'', 9''', the sequencer may power said heater mats in an order and at a frequency that are preestablished, for example, or indeed as a function of information such as information reaching it from temperature or ice sensors.

It can be understood that the sequencer may be electronic equipment that is particularly simple, or indeed that may include a processor or the equivalent for the purpose of powering and controlling the equipment 9.

Furthermore, the device 10 is provided with control means 51 for ordering the sequencer to transfer electricity to a particular piece of equipment 9.

The control means 51 are located in the stationary frame of reference, being secured to the airframe 3 and not to the rotor 5. The control means 51 may comprise an electrical switch for switching the equipment 9 on and off.

Consequently, the control means need to be able to transmit an order to the sequencer 50.

Under such circumstances, the device 10 possesses contactless connection means 200 enabling said order to pass from a stationary frame of reference associated with the airframe to a rotary frame of reference associated with the rotor without degrading the information that is conveyed, and possibly also a signal from the rotary frame of reference going to the stationary frame of reference.

Like the transformer, the contactless connection means comprise a stationary member 62 connected to the airframe 3 and communicating with the control means 51, and a rotary member 63 constrained to rotate with the rotor 5 and communicating with the sequencer 50.

In a preferred embodiment, the contactless connection means 200 are an optical rotary joint 60, the stationary member 62 communicating with the control means 51 via an optical fiber 65 while the rotary member 63 communicates for example with the sequencer via another optical fiber 66.

The optical rotary joint 60 may also include at least one lens 64 between the stationary member 62 and the rotary member 63.

In a variant, the lens is a unidirectional lens favoring the transfer of information from the stationary member 62 towards the rotary member 63. In another variant, the lens is a bidirectional lens favoring the transfer of information from the stationary member 62 to the rotary member 63, and also from the rotary member 63 to the stationary member 62.

In another version, the contactless connection means 200 comprises a rotary joint using ultrasound. By way of example, the control means communicate via ultrasound waves with the stationary member 62, the stationary member communicating with the rotary member 63 via ultrasound waves, the rotary member 63 finally communicating with the sequencer via ultrasound waves.

In another version, the stationary member 62 is a first transmit and/or receive antenna, the rotary member being a second receive and/or transmit antenna that communicates with the first antenna at high frequency.

Figure 2:
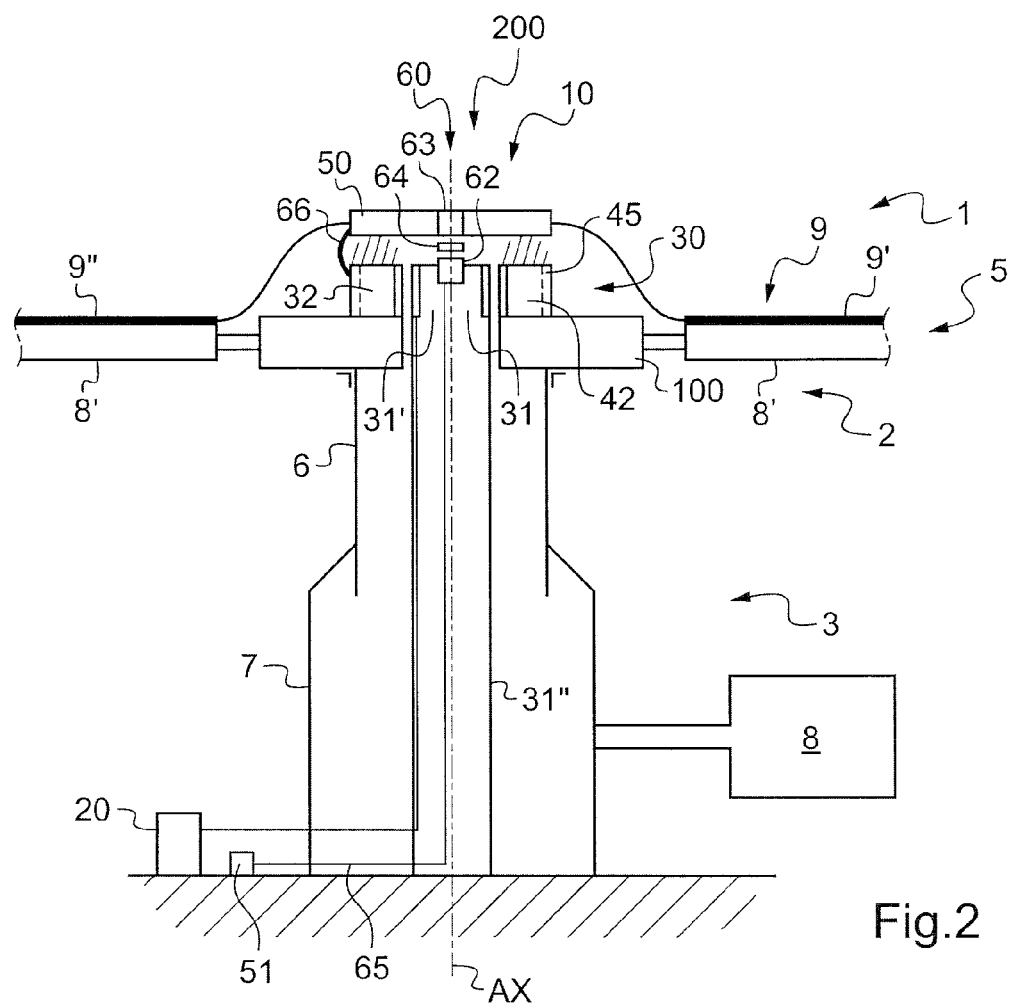
FIG. 2 is a diagrammatic section of an aircraft of the invention.

FIG. 2 is a section of an aircraft 1 showing a variant arrangement of the device 10.

The aircraft 1 comprises a power plant 8' driving a power gearbox 7 and finally a mast 6 conventionally referred to as the "rotor mast". The gearing of the power gearbox is not shown to avoid overcrowding FIG. 2.

The mast 6 is then secured to a hub 100 of the rotor 5, the main lift rotor of a helicopter, for example, with the hub driving a plurality of blades 8'.

In addition, the rotor then includes at least one piece of equipment 9, e.g. comprising means 9', 9" for combating icing, such as means of the anti-icing or de-icing type. These means for combating icing may be active, e.g. taking temperature regulation parameters into consideration, or they may be passive.

Under drive from the power plant delivered via the power gearbox 7, the mast 6 drives elements that are secured to the rotor 5 in rotation about an axis of rotation AX.

The aircraft then has a device 10 for electrically powering or even controlling the equipment 9.

The electricity generator 20 and the control means 51 are arranged within the airframe 3. Under such circumstances, the device 10 has a power transformer 30 and contactless connection means 200 respectively for connecting the electricity generator 20 and the control means 51 to a sequencer 50.

The power transformer 30 has a stationary portion 31 connected to the airframe 3. For example, the stationary portion comprises an active portion 31' for transmitting electricity as such, and a fastener shaft 31" securing said active portion to the airframe 3.

The fastener shaft passes inside the mast 6 so as to be secured to the airframe 3, directly as shown in FIG. 2, or indirectly via the power gearbox 7, for example.

Similarly, the fastener shaft 31" passes through the hub so that the active portion 31' for transferring electricity is above the hub 100.

The power transformer 30 also includes a rotary portion 32 above the hub, this rotary portion nevertheless being fastened to the hub 100 in order to rotate about the axis of rotation AX together with the rotor 5. The rotary portion 32 then surrounds the stationary portion 31, and more particularly the active portion 31' of the stationary portion constituting the primary member of the transformer.

The rotary portion is also fitted with an electrical converter 45 that communicates with the sequencer 50. The electrical converter 45 is fastened to the rotary portion 32 of the transformer by conventional means, this rotary portion then acting as the secondary member of the transformer 30 and of the electrical converter.

The sequencer 50 is then connected to the equipment 9, to the means 9', 9" of said equipment 9 for combating icing, for example.

Furthermore, the contactless connection means comprise a rotary joint 60 in the form of a stationary member 62 secured to the airframe 3, the stationary member 62 facing a rotary member 63 of the rotary joint 60, e.g. a member that is fastened to the center of the sequencer 50 so as to be constrained to rotate with the rotor 5 about the axis of rotation AX.

In one version, the rotary joint is an optical rotary joint. An assembly comprising at least one unidirectional or bidirectional lens 64 may then be arranged between the stationary member 62 and the rotary member 63.

Independently of the embodiment, the rotary joint 60, the rotary portion 32, and said stationary portion 31 of the power transformer lie on the same axis.

Figure 3:
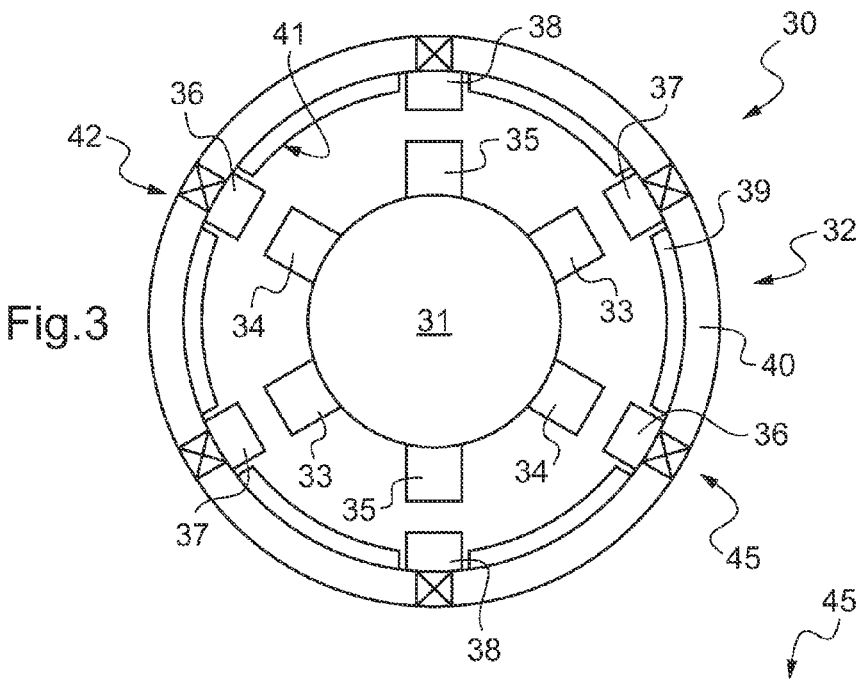
FIG. 3 is a section of the transformer.

FIG. 3 is a diagrammatic section of a power transformer 30 of the invention.

The stationary portion 31 represents the primary member of the transformer 30. Under such circumstances, the stationary portion has three primary windings 33, 34, and 35 that are geometrically phase-offset from one another at angles of one hundred twenty degrees.

The three primary windings 33, 34, and 35 are connected via three respective electrical conductors to the electricity generator 20 that delivers a conventional three-phase supply.

The three primary windings then create a rotary magnetic field that co-operates with the secondary member of the transformer, i.e. the rotary portion 32.

The secondary member is swept by the rotary field at a frequency of rotation that is equal to the frequency of the phases plus the frequency of rotation of the rotor, providing the variant windings are suitably connected. The rotary field then advantageously performs rotation in the opposite direction to the rotor 5 so as to maximize its frequency of rotation. For example, if the angular frequency of the phases is 115 Hz and if the rotor is rotating at a frequency of 5 Hz, then the magnetic field passing through the turns of the secondary member corresponds to a frequency of 120 Hz.

It should be observed that the rotor may vary a little in speed. AC is converted into DC so as to avoid transmitting a varying frequency to the sequencer, where such a varying frequency could damage the sequencer and the various electrical circuits concerned.

In addition, the secondary member has at least one set of three three-phase secondary windings 36, 37, and 38 arranged around an inner periphery 41 of the rotary portion facing the stationary portion 31, an airgap separating the secondary windings 36, 37, and 38 from the primary windings 33, 34, and 35. The inner periphery may also include a magnetic circuit 39.

Furthermore, the rotary portion 32 includes an electrical converter of the PD3 type rectifier leading to the outer periphery 42 of the rotary portion in order to be accessible, thereby favoring any maintenance should that be necessary. The rectifier may also be duplicated for safety reasons, thereby advantageously providing redundancy.

Figure 4:
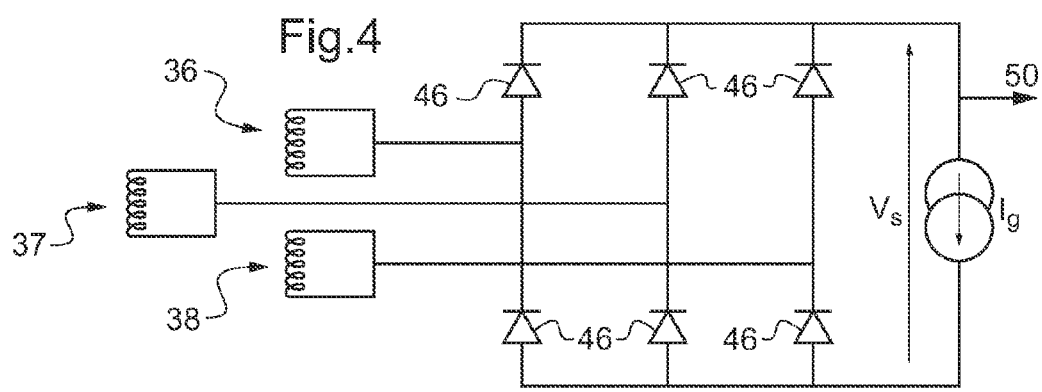
FIG. 4 is a circuit diagram of one version of the electrical converter of the transformer.

FIG. 4 is an electrical circuit diagram showing such an electrical converter 45 of the PD3 rectifier type.

The terminals of each secondary winding 36, 37, and 38 are connected to the electrical converter 45 of the PD3 rectifier type, the electrical converter 45 conventionally comprising diodes or thyristors 46.

Finally, the electrical converter 45 is connected by an electrical conductor to the sequencer 50.

Figure 5:
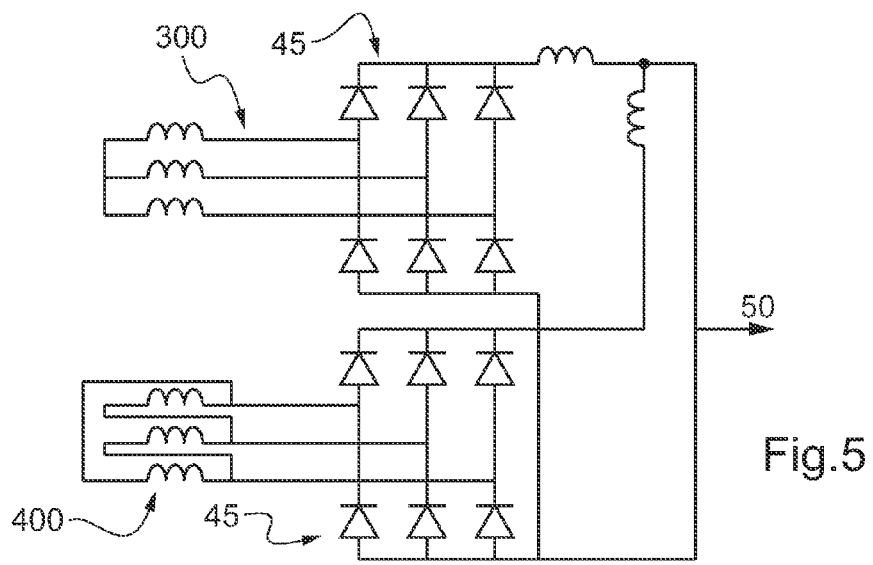
FIG. 5 is a diagram of a transformer having two secondary members and two electrical converters.

It should be observed that two sets of three secondary windings may be provided as a safety measure. In the option shown in FIG. 5, a first set of windings 300 is then connected in a star configuration while the second set of windings 400 is connected in a delta configuration so as to optimize transformation into DC, each set of windings co-operating with a respective electricity converter 45.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An aircraft provided with a rotor driven by a rotor mast set into rotation by a power gearbox located inside an airframe of an aircraft, said rotor including at least one piece of electrical equipment, wherein the aircraft includes an electrical power supply and control device for equipment of said rotor, the device having a three-phase AC generator in a stationary frame of reference, wherein the device includes a rotary field transformer having a stationary portion electrically connected to said generator and a rotary portion electrically connected to a sequencer that is arranged in a rotary frame of reference, said device including control means for controlling the sequencer and located in said stationary frame of reference, the control means being connected to the sequencer by contactless connection means, said sequencer being suitable for electrically powering said equipment on order of said control means, the device having the three-phase AC generator arranged in said airframe, the stationary portion of the rotary field transformer connected to said airframe and the rotary portion constrained to rotate with said rotor, the sequencer constrained to rotate with said rotor, the control means arranged in the airframe.

2. An aircraft according to claim 1, wherein said stationary portion is surrounded by said rotary portion.

3. An aircraft according to claim 1, wherein said stationary portion has three three-phase primary windings, and said rotary portion has three three-phase secondary windings.

4. An aircraft according to claim 1, wherein said contactless connection means, said rotary portion, and said stationary portion lie on a common axis.

5. An aircraft according to claim 1, wherein said contactless connection means (200) are an ultrasound rotary joint.

6. An aircraft according to claim 1, wherein said contactless connection means comprise a first antenna connected to the control means and a second antenna connected to the sequencer.

7. An aircraft according to claim 1, wherein said stationary portion includes a fastener shaft inside said mast for fastening to said airframe, said rotary portion, and said sequencer being secured to said rotor.

8. An aircraft according to claim 1, wherein said equipment includes at least one means suitable for combating icing.

9. An aircraft according to claim 1, wherein the contactless connection means between the rotary portion and the stationary portion are coaxial.

10. An aircraft according to claim 1, wherein the rotary portion, the stationary portion, and the contactless connection means are concentric with one another.

11. An aircraft according to claim 1, wherein said rotary portion includes at least one electrical converter of the PD3 rectifier type to deliver DC to said sequencer.

12. An aircraft according to claim 11 wherein said rotary portion has an inner periphery facing the stationary portion and an outer periphery, said electrical converter leading to said outer periphery.

13. An aircraft according to claim 1, wherein said contactless connection means are an optical rotary joint comprising a stationary member connected by an optical fiber to said control means, and a rotary member connected to said sequencer.

14. An aircraft according to claim 13, wherein said optical rotary joint includes at least one unidirectional lens favoring the passage of an order from said stationary member to said rotary member.

15. An aircraft according to claim 13, wherein said optical rotary joint includes at least one bidirectional lens favoring the passage of a signal from said stationary member to said rotary member, and from said rotary member to said stationary member.

* * * * *